US012600628B2

(12) United States Patent
Kim et al.

(10) Patent No.: US 12,600,628 B2
(45) Date of Patent: Apr. 14, 2026

(54) INORGANIC HOLLOW NANOCOILS AND METHOD OF MANUFACTURING THE SAME

(71) Applicant: KOREA UNIVERSITY RESEARCH AND BUSINESS FOUNDATION, Seoul (KR)

(72) Inventors: Young Keun Kim, Seoul (KR); Jun Hwan Moon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 880 days.

(21) Appl. No.: 17/839,966

(22) Filed: Jun. 14, 2022

(65) Prior Publication Data

US 2023/0029603 A1     Feb. 2, 2023

(30) Foreign Application Priority Data

Jul. 30, 2021     (KR) ........................ 10-2021-0100858

(51) Int. Cl.
| | |
|---|---|
| *C01B 25/45* | (2006.01) |
| *B82Y 30/00* | (2011.01) |
| *B82Y 40/00* | (2011.01) |
| *C01B 25/37* | (2006.01) |

(52) U.S. Cl.
CPC .............. *C01B 25/45* (2013.01); *C01B 25/37* (2013.01); *C01B 25/377* (2013.01); *B82Y 30/00* (2013.01); *B82Y 40/00* (2013.01); *C01P 2002/85* (2013.01); *C01P 2004/04* (2013.01); *C01P 2004/13* (2013.01)

(58) Field of Classification Search
None
See application file for complete search history.

(56) References Cited

U.S. PATENT DOCUMENTS

2018/0327919 A1     11/2018   Kim et al.

FOREIGN PATENT DOCUMENTS

| KR | 10-2016-0088548 A | 7/2016 |
|---|---|---|
| KR | 10-1916588 B1 | 11/2018 |

OTHER PUBLICATIONS

Moon et al. "Inorganic Hollow Nanocoils Fabricated by Controlled Interfacial Reaction and Their Electrocatalytic Properties", Small 2021, 17, 2103575 (Year: 2021).*
Korean Office Action issued on Apr. 27, 2023, in corresponding Korean Patent Application No. 10-2022-0012074 (5 pages in Korean).

(Continued)

*Primary Examiner* — Coris Fung
*Assistant Examiner* — Jialan Zhang
(74) *Attorney, Agent, or Firm* — NSIP Law

(57) ABSTRACT

The present invention relates to hollow nanocoils having a three-dimensional helical structure in the form of a hollow tube and a method of manufacturing the same. The present invention provides a method of synthesizing metal nanocoils into inorganic hollow nanocoils using the galvanic replacement reaction and an electrochemical reaction including the Kirkendall effect. The inorganic hollow nanocoil structure body of the present invention can be applied to various fields such as sensors, catalysts, batteries, or gene delivery and therapy using a large surface area.

14 Claims, 8 Drawing Sheets

Galvanic Replacement Reaction and Kirkendall Effect

(56) References Cited

OTHER PUBLICATIONS

Min, Sunhong, et al. "Remote Control of Time-Regulated Stretching of Ligand-Presenting Nanocoils In Situ Regulates the Cyclic Adhesion and Differentiation of Stem Cells." *Advanced Materials* 33.11 (Feb. 2, 2021): 2008353.

Li, Jinxing, et al. "Template electrosynthesis of tailored-made helical nanoswimmers." *Nanoscale* 6.16 (Dec. 6, 2014): pp. 9415-9420.

Samardak, Aleksei Yu, et al. "Magnetization reversal of ferromagnetic nanosprings affected by helical shape." *Nanoscale* 10.43 (Oct. 30, 2018): pp. 20405-20413.

Xia, Xiaohu, et al. "25th Anniversary Article: Galvanic replacement: a simple and versatile route to hollow nanostructures with tunable and well-controlled properties." *Advanced Materials* 25.44 (Nov. 2013): pp. 6313-6333.

Chee, See Wee, et al. "Direct observation of the nanoscale Kirkendall effect during galvanic replacement reactions." *Nature communications* 8.1 (Oct. 31, 2017): pp. 1-8.

Merkoçi, Florind, et al. "Understanding galvanic replacement reactions: the case of Pt and Ag." *Materials Today Advances* 5 (Jan. 8, 2020): 100037.

Feng, Ji, and Yadong Yin. "Self-templating approaches to hollow nanostructures." *Advanced Materials* 31.38 (Sep. 31, 2019): 1802349.

Yu, Le, et al. "Complex hollow nanostructures: synthesis and energy-related applications." *Advanced Materials* 29.15 (Apr. 29, 2017): 1604563.

Chen, Yu Ming, Zhen Li, and Xiong Wen Lou. "General formation of MxCo3-xS4 (M= Ni, Mn, Zn) hollow tubular structures for hybrid supercapacitors." *Angewandte Chemie* 127.36 (Sep. 1, 2015): pp. 10667-10670.

Mosquera, Jesús, et al. "Sequence-selective encapsulation and protection of long peptides by a self-assembled Fe118L6 cubic cage." *Nature communications* 8.1 (Mar. 30, 2017): pp. 1-6.

* cited by examiner

| Element | Line Type | k Factor | K Factor type | Absorption Correction | Wt% | Wt% Sigma | Atomic % |
|---|---|---|---|---|---|---|---|
| O | K series | 2.133 | | 1.00 | 48.08 | 0.26 | 68.64 |
| Al | K series | 1.070 | | 1.00 | 9.09 | 0.11 | 7.69 |
| P | K series | 1.105 | | 1.00 | 17.91 | 0.17 | 13.25 |
| K | K series | 1.040 | | 1.00 | 0.58 | 0.04 | 0.34 |
| V | K series | 1.103 | | 1.00 | 0.64 | 0.04 | 0.29 |
| Mn | K series | 1.082 | | 1.00 | 20.79 | 0.16 | 8.64 |
| Fe | K series | 1.047 | | 1.00 | 2.37 | 0.08 | 0.97 |
| Co | K series | 1.052 | | 1.00 | 0.49 | 0.04 | 0.19 |
| Total | | | | | 100.00 | | 100.00 |

INORGANIC HOLLOW NANOCOILS AND METHOD OF MANUFACTURING THE SAME

CROSS-REFERENCE TO RELATED APPLICATIONS

This application claims the benefit under 35 U.S.C. 119 (a) of Korean Patent Application No. 10-2021-0100858 filed on Jul. 30, 2021 in the Korean Intellectual Property Office, the entire disclosure of which is incorporated herein by reference for all purposes.

1. FIELD OF THE INVENTION

The present invention relates to inorganic hollow nanocoils having a three-dimensional helical structure in the form of a hollow tube and to a method of manufacturing the same, and more specifically, to the synthesis of inorganic natural nanocoils prepared by electroplating and utilizing diffusion differences between materials in a colloidal solution. The hollow nanocoils can be used in various fields such as catalysts, sensors, gene delivery and therapy.

2. DISCUSSION OF RELATED ART

Coils are helical topological structures prevalent in nature and play a number of pivotal roles in science and technology. In particular, the nanoscale helical shape has unique physicochemical characteristics such as plasmonic chirality, magnetization reversal, and the quantum Hall effect, and can be utilized in a variety of applications. For example, since the magnetic nanocoils (NC) can be stretched or contracted by an external magnetic field, it is possible to control stem cell adhesion and differentiation in vivo (Non-Patent Document 1). When a continuous torque is applied, the resulting rotation around the coil axis is converted into translational corkscrew motion, which can function as a nanomotor in a fluid system (Non-Patent Document 2). The structure of arranged $WO_3$ nanocoils has the advantage of effective charge separation and transport during photolysis of water due to its large surface area and other structural characteristics. The optical characteristics of certain nanocoils, such as circular dichroism, can be exploited for use in nanosensors and metamaterials. In order to take advantage of the characteristics arising from the unique structure of nanocoils, various synthesis methods such as template-assisted electrosynthesis, bioinspired methods, soft template synthesis, and focused electron/ion beam-induced deposition have been developed over the past decade (Non-Patent Document 3). However, despite these efforts, the materials and shapes that each synthesis method can handle are quite limited, and considerable effort is required due to the complexity of the related procedures. Therefore, a general method of synthesizing nanocoils of various shapes and compositions remains an active challenge. As a method of manufacturing such a nanocoil, there is glancing angle deposition, electrodeposition using a nanoporous template having nanometer-sized pores such as anodized aluminum oxide, and a method of depositing a thin film and then rolling it up (rolled-up).

These technologies are methods related to fabrication on micrometer-sized polymers or metal nanocoils, and there was a difficulty in manufacturing hollow nanocoils. Methods for manufacturing a hollow helix known so far include a method using carbon nanotubes (CNT) and a biomimic method using helical bacteria.

Conversion chemistry is attracting attention as the performance index is optimized in various fields through multiple manipulations. In particular, the galvanic replacement (GR) reaction, which depends on the electrochemical potential difference of different materials, has been utilized to design nanomaterials having various compositions and shapes. The Kirkendall effect (KE) combined with GR occurs at unequal diffusion rates of different atomic species undergoing interdiffusion, allowing nanomaterials to establish various shapes such as hollow and frame shapes (Non-Patent Documents 4 and 5). Numerous synthetic parameters such as reaction temperature and time, metal template to precursor ratio, presence of cosurfactants, type of ionic species and sequence of reagent addition can be precisely controlled for targeted synthesis of various specific structures (Non-Patent Document 6). Hollow materials having unique characteristics of large surface area, low density, and abundant internal pores, can be utilized in energy production and storage applications (e.g., batteries and catalysts) and life sciences (e.g., DNA, enzyme carriers and pharmaceutical complexes) (Non-Patent Documents 7 to 10). However, hollow nanocoils (HNCs) for use in these fields have not yet been reported due to the difficulty of synthesizing such structures and the lack of suitable templates. In particular, limited research has been conducted to develop an HNC preparation method of a three-dimensional transition metal (TM)-based material and its application. Synthesis of hollow nanomaterials from globally abundant one-row TM-based composites has emerged as one of the most important scientific endeavors due to their environmentally friendly characteristics, and therefore the nanomaterials can be used as electrochemical catalysts, energy storage materials for water decomposition, rechargeable batteries and supercapacitors. There is a wide range of application possibilities for TM-based HNCs that have large surface areas and are easy to stretch and compress compared to other structures. In this study, we aimed to present a simple method of manufacturing these materials through GR and KE.

The present invention provides a method of synthesizing metal nanocoils into inorganic hollow nanocoils using the galvanic replacement reaction and an electrochemical reaction including the Kirkendall effect.

A hollow nanocoils structure body can be applied to various fields such as sensors, catalysts, or gene delivery and therapy using a large surface area.

PRIOR ART LITERATURE

Non-Patent Literature (Non-Patent Document 1): Adv. Mater. 2021, 33, 2008353.
(Non-Patent Document 2): Nanoscale 2014, 6, 9415.
(Non-Patent Document 3): Nanoscale 2018, 10, 20405.
(Non-Patent Document 4): Adv. Mater. 2013, 25, 6313.
(Non-Patent Document 5): Nat. Commun. 2017, 8, 1224.
(Non-Patent Document 6): Mater. Today Adv. 2020, 5, 100037.
(Non-Patent Document 7): Adv. Mater. 2019, 31, 1802349.
(Non-Patent Document 8): Adv. Mater. 2017, 29, 1604563.
(Non-Patent Document 9): Angew. Chem. 2015, 127, 10667.
(Non-Patent Document 10): Nat. Commun. 2017, 8, 14882.

SUMMARY OF THE INVENTION

An object of the present invention is to provide hollow nanocoils having a three-dimensional helical structure in the form of a hollow tube and a method of manufacturing the same.

The present invention provides inorganic hollow nanocoils having a helical structure in the form of a hollow tube.

In addition, the present invention provides a method of manufacturing inorganic hollow nanocoils including:

preparing a solution in which sacrificial nanocoils containing a transition metal are dispersed; and reacting by adding a metal precursor and an acidic solution to the solution in which the sacrificial nanocoils are dispersed.

Effects of the Invention

The inorganic hollow nanocoils according to the present invention can be produced by a simple method in which a metal precursor containing a metal oxide or transition metal is filled into a nanoframe, such as anodized aluminum oxide, and then synthesized in a high temperature solution containing acid and metal ions, using sacrificial nanocoils synthesized using an electroplating method.

The inorganic hollow nanocoils according to the present invention can provide high sensitivity and recovery rates in catalytic activity or sensor properties using the large surface area of the hollow nanocoils, and can be utilized in the energy storage device market due to material properties, with the helical shape going forward through specific movement in the fluid and the inside of the nanostructure providing a space capable of delivering the material to a particular site.

Therefore, the inorganic hollow nanocoils according to the present invention can be used for sensors and catalysts using a large surface area, and can also be applied to biomedical fields such as drug delivery and gene delivery, and energy fields such as batteries depending on materials.

DETAILED DESCRIPTION OF EXEMPLARY EMBODIMENTS

Hereinafter, the present invention will be specifically described.

The present invention provides inorganic hollow nanocoils having a helical structure in the form of a hollow tube. The hollow nanocoil according to the present invention is completely empty inside, and has a three-dimensional cylindrical nanocoil shape having a shell of a relatively uniform thickness.

The inorganic hollow nanocoil consists of XaZc and/or Xa'YbZc', or XaWdYbZc, wherein in the case of XaZc and/or Xa'YbZc', X may be Cr or Mn; Y may be P; Z may be O; and a+a':b:c+c' may be 1:1:4 to 1:1.4:7.5 or 1:0.1:1.5 to 1:0.3:4; and in the case of XaWdYbZc, wherein X may be Mn; W may be Al; Y may be P; Z may be O; and a:d:b:c may be 1:0.7:1.4:6.5 to 1:1:1.7:9.

The hollow nanocoil consists of an inorganic material, and may consist of metal ions (cations) and anions. The metal ion may be Cr, Mn, etc., and the anion may be an oxide, hydroxide, phosphate, etc. In an embodiment of the present invention, the Cr-based hollow nanocoil consists of Cr, P and O, and the Mn-based hollow nanocoil consists of Mn, O, and P. The MnAl-based hollow nanocoil consists of Mn, Al, O, and P.

In addition, the hollow nanocoil manufactured in the embodiment of the present invention can control the surface roughness of the hollow nanocoil by adjusting the reduction path of the material according to a material (the kind of precursor metal used in the reaction).

Figure 4A:
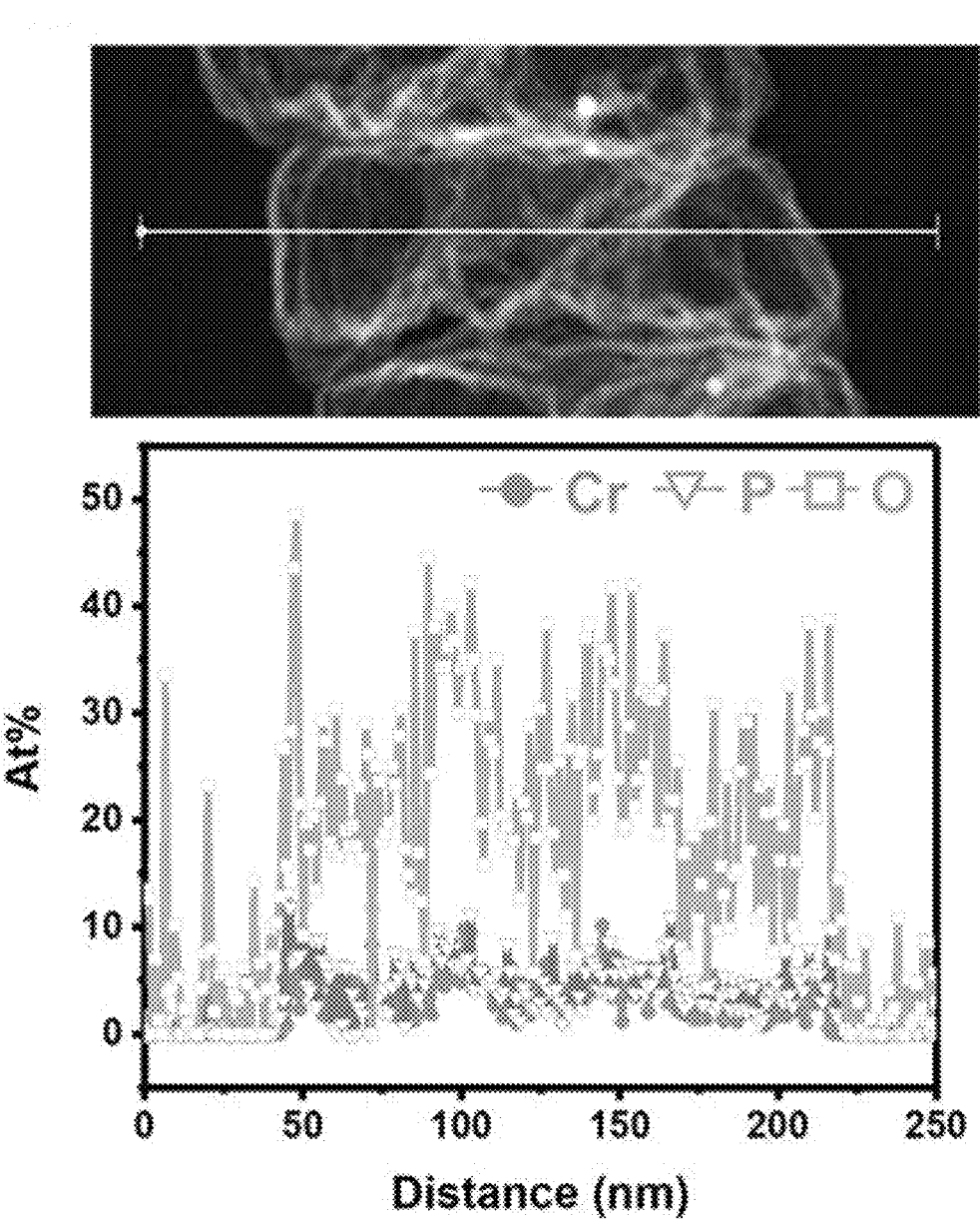
FIG. 4A is a Cr-based hollow nanocoil.
Figure 4B:
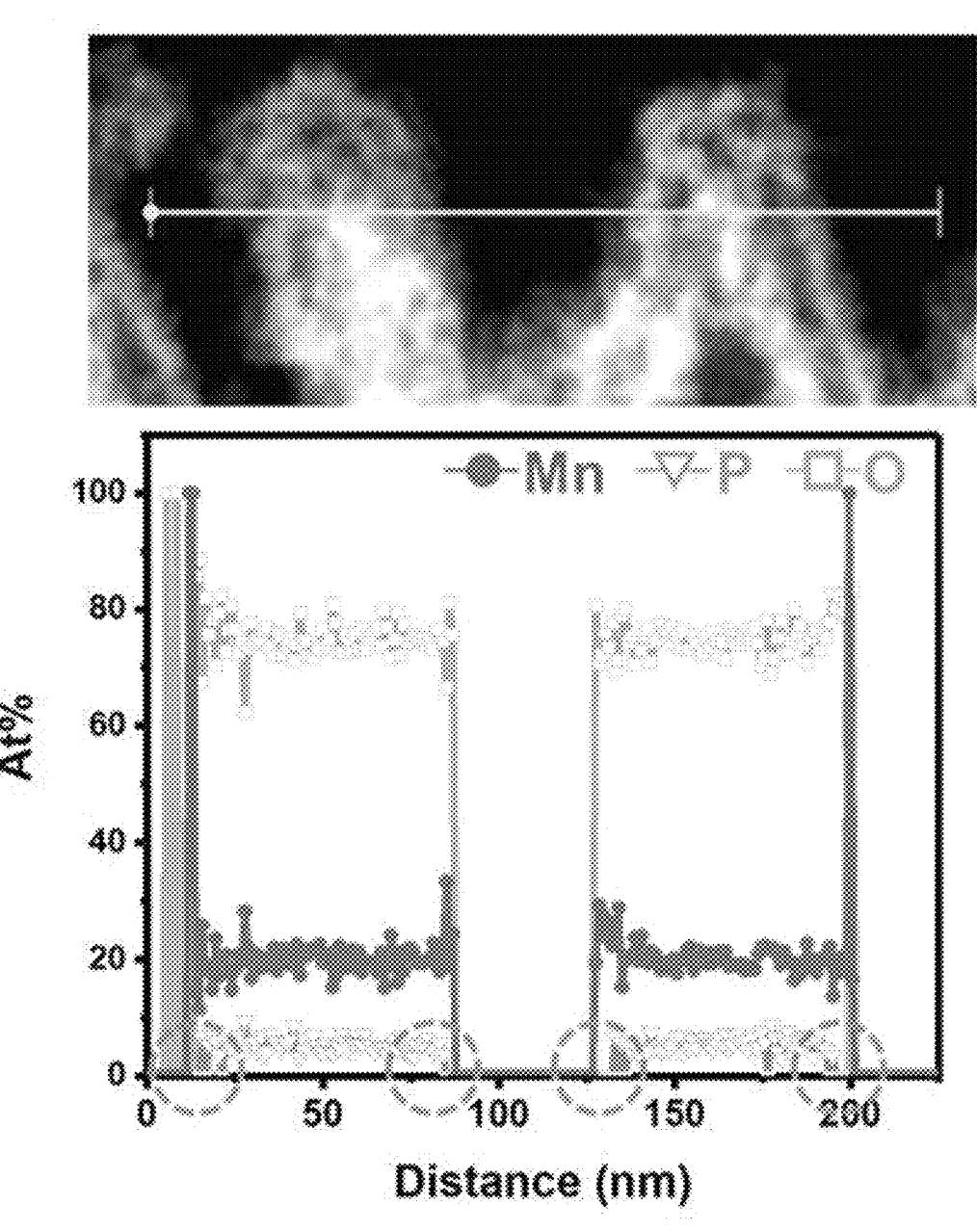
FIG. 4B is an enlarged transmission electron micrograph and Line-EDX result graph of a Mn-based hollow nanocoil.

In an embodiment of the present invention, the Cr-based hollow nanocoil has a relatively smooth (soft, uneven) surface in which the surface is made of a single component ($CrPO_4$) because Cr is reduced by a single path (FIG. 4A), whereas the Mn based hollow nanocoil has a relatively rough (convoluted) surface in which Mn is reduced via multiple paths (multicomponent: $MnO_x$—$MnP_yO_z$), the inner surface (inner shell) consists of a metal phosphate ($MnP_yO_z$) having a relatively low oxidation number, and the outer surface (outer shell) has a relatively high oxidation number on which a metal oxide ($MnO_x$) has been positioned (FIG. 4B). The MnAl-based hollow nanocoil has a relatively smooth (smooth, non-irregular) surface because $Al^{3+}$ ions present in solution penetrate the $MnO_x$ or $MnP_yO_z$ structure to form a MnAl-based single-component complex.

The inorganic hollow nanocoil may consist of Xa'YbZc', wherein X may be Cr; Y may be P; Z may be O; and a':b:c' may be 1:1:4 to 1:1.4:7.5. In an embodiment of the present invention, the ratio of elements constituting the Cr-based hollow nanocoil ($CrPO_4$) was Cr:P:O=10.85:13.38:75.77.

The inorganic hollow nanocoil may consist of XaZc and Xa'YbZc', wherein X may be Mn; Y may be P; Z may be O, a:c may be 1:2 to 1:4, a':b:c' may be 1:0.15:3 to 1:0.4:5, and a+a':b:c+c' may be 1:0.1:1.5 to 1:0.3:4. In an embodiment of the present invention, the ratio of elements constituting the Mn-based hollow nanocoil ($MnO_x$—$MnP_yO_z$) was inner shell Mn:P:O=19.87:5.33:74.79, outer shell Mn:O=25.52: 74.48, and the total elemental ratio of the Mn-based hollow nanocoil was Mn:P:O=25.61:5.32:63.06.

The inorganic hollow nanocoil may consist of XaWdYbZc, wherein X may be Mn; W may be Al; Y may be P; Z may be O, and a:d:b:c may be 1:0.7:1.4:6.5 to 1:1:1.7:9. In an embodiment of the present invention, the ratio of elements constituting the MnAl-based hollow nanocoil was Mn:Al:P:O=8.64:7.69:13.25:68.64. The outer diameter of the hollow nanocoil may be 50 nm to 500 nm.

The shell thickness of the hollow nanocoil may be 2 nm to 25 nm.

As used herein, the term "shell" refers to the tube wall of a hollow nanocoil in the form of a hollow tube.

The outer diameter, shell thickness, size, length, etc. of the hollow nanocoil can be adjusted to be appropriately used in the field and technology to be applied, and the size of the hollow nanocoil can be adjusted depending on the sacrificial nanocoil.

As another aspect of the present invention, the present invention provides a method of manufacturing inorganic hollow nanocoils, including:

preparing a solution in which sacrificial nanocoils containing a transition metal are dispersed; and reacting by adding a metal precursor and an acidic solution to the solution in which the sacrificial nanocoils are dispersed.

In the present invention, the sacrificial nanocoil includes a transition metal, and the transition metal may be a metal including at least one selected from the group consisting of Sc, Ti, V, Cr, Mn, Fe, Co, Ni, Cu, Zn, Y, Zr, Nb, Mo and Tc, and preferably, a metal including at least one selected from the group consisting of V, Co, Fe or Ni. Any transition metal having a relatively lower reduction potential than a metal precursor for manufacturing inorganic hollow nanocoils may be used. In the present invention, a CoFe sacrificial nanocoil having a reduction potential lower than that of Cr or Mn was used.

The sacrificial nanocoils containing the transition metal may be 0.005 to 0.2% (w/v), preferably 0.006 to 0.15% (w/v), more preferably 0.007 to 0.1% (w/v) based on the total reaction solution.

The metal precursor may be a metal including one or more selected from the group consisting of Cr and Mn. Any metal precursor capable of forming $HCrO_4^-$, $Cr_2O_7^{2-}$, and $MnO_4^-$ in an aqueous solution when the corresponding metal precursor is dissolved may be used. For example, it may be $H_2CrO_4$, $CrO_3$, $LiMnO_4$, $NaMnO_4$, or $KMnO_4$, preferably $CrO_3$ or $KMnO_4$, but is not limited thereto.

The metal precursor may have a concentration of 1 to 10 mM, preferably 1.5 to 8 mM, more preferably 1.7 to 7 mM, based on the total reaction solution.

The acidic solution may be a solution of hydrochloric acid (HCl), nitric acid ($HNO_3$), sulfuric acid ($H_2SO_4$), or phosphoric acid ($H_3PO_4$).

The acidic solution may further include potassium phosphate ($KH_2PO_4$), dipotassium phosphate ($K_2HPO_4$), tripotassium phosphate ($K_3PO_4$), sodium dihydrogen phosphate ($NaH_2PO_4$), disodium hydrogen phosphate ($Na_2HPO_4$) or trisodium phosphate ($Na_3PO_4$).

In an embodiment of the present invention, phosphoric acid ($H_3PO_4$) was added as an acidic solution, and phosphoric acid provides hydrogen ions in the solution in the reaction to make the solution acidic to dissolve the CoFe sacrificial nanocoil, and served to provide phosphorylated anions participating in the binding of the final product (inorganic hollow nanocoils). Phosphorylated anions participate in the reaction, and a metal (metal 1 (in the present invention, CoFe sacrificial nanocoil) is converted to a metal phosphate (metal 2 (in the present invention, Cr, Mn or MnAl) phosphate (or oxide)). Phosphoric acid was used in the Examples because it can perform the above two roles at one time, but the reaction of synthesizing the final product may proceed even when materials capable of performing each role are simultaneously added. The reaction of the present invention may proceed even when the acidic solution, such as hydrochloric acid (HCl), nitric acid ($HNO_3$), sulfuric acid ($H_2SO_4$), etc., and phosphorylated materials, such as potassium phosphate ($KH_2PO_4$), dipotassium phosphate ($K_2HPO_4$), tripotassium phosphate ($K_3PO_4$), sodium dihydrogen phosphate ($NaH_2PO_4$), disodium hydrogen phosphate ($Na_2HPO_4$) or trisodium phosphate ($Na_3PO_4$) are simultaneously added.

The reaction may be carried out at 50 to 100° C., preferably 60 to 90° C., more preferably 65 to 80° C.

The reaction may be carried out at a pH of 0.5 to 3, preferably a pH of 0.7 to 2.5, more preferably a pH of 0.9 to 2.

The reaction may be carried out for 0.5 to 2 hours, preferably 0.5 to 1.5 hours. The reaction time can be adjusted to prepare nanocoils with desired properties. When the reaction time becomes shorter, more characteristics of the sacrificial nanocoils can be obtained, and when the reaction time becomes longer, it can have more characteristics of the inorganic hollow nanocoils.

Figure 1A:
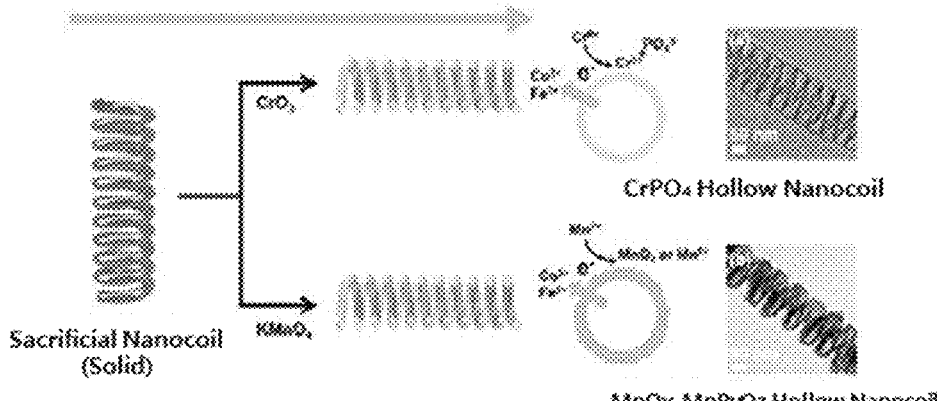
FIG. 1A is a schematic diagram of the manufacturing process of (a) hollow nanocoils and (b) a transmission electron micrograph of $CrPO_4$ hollow nanocoils $MnO_x$—$MnP_yO_z$ hollow nanocoils.
Figure 1B:
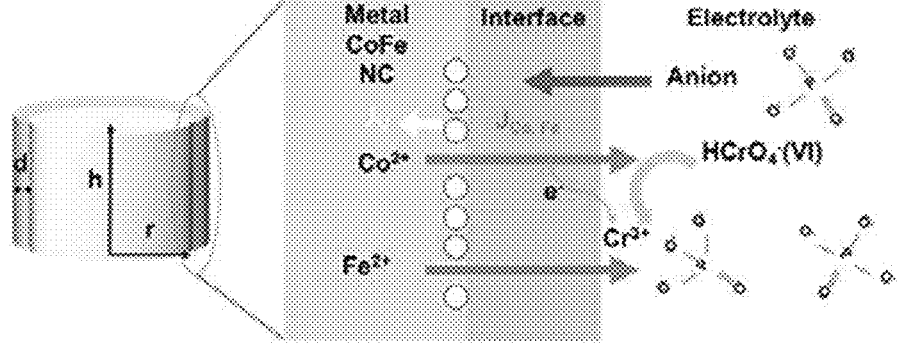
FIG. 1B is a schematic diagram showing the formation of $CrPO_4$ hollow nanocoils on the surface of sacrificial nanocoils.
Figure 1C:
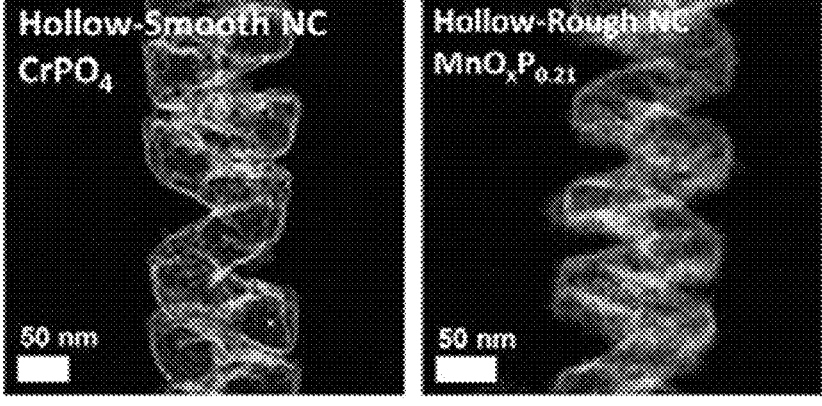
FIG. 1C is a clearer transmission electron micrograph of $CrPO_4$ hollow nanocoils and $MnO_x$—$MnP_yO_z$ hollow nanocoils.
Figure 2A:
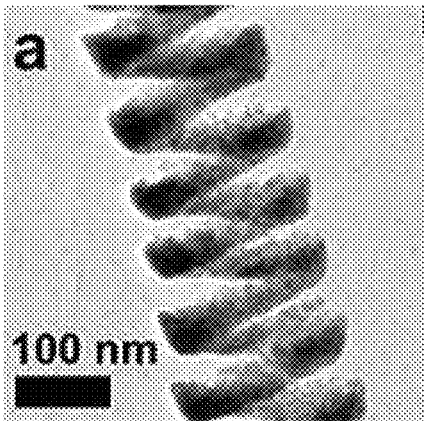
FIGS. 2A to 2D are transmission electron micrograph of changes in hollow nanocoils according to reaction time (2a: sacrificial nanocoils before reaction, 2b: nanocoils in the initial stage of reaction, 2c: nanocoils in the middle stage of reaction, and 2d: hollow nanocoils after completion of reaction).
Figure 2B:
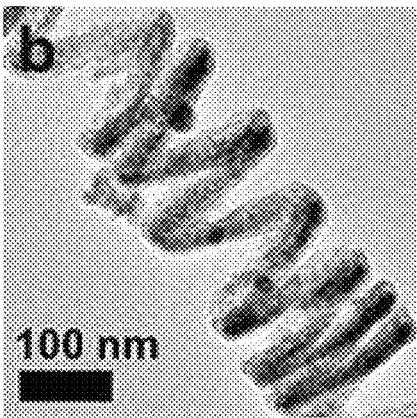
Figure 2C:
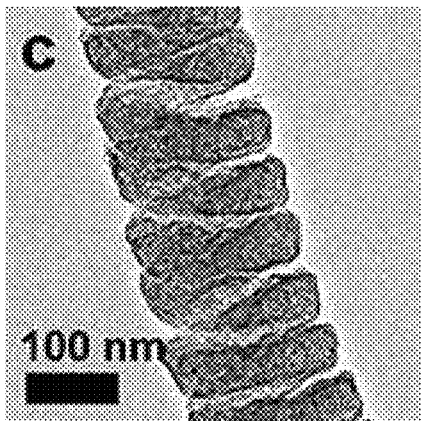
Figure 2D:
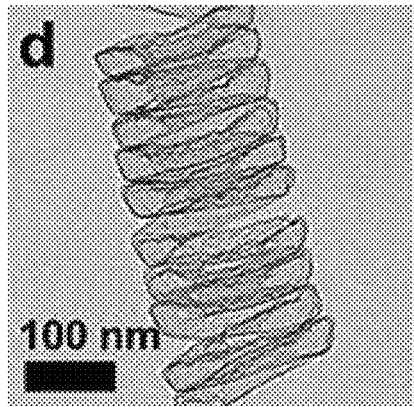

The reaction principle of the present invention is shown in FIGS. 1A and 1B, and the process in which the sacrificial nanocoils are synthesized into inorganic hollow nanocoils over time is shown in FIGS. 2A to 2D. The sacrificial nanocoil having a relatively low reduction potential is oxidized under acidic conditions and ionized in solution, and the generated extra electrons reduce the metal precursor ion having a relatively high reduction potential (Galvanic replacement reaction) and then are combined with phosphate anions in the solution to form an interface along the surface of the hollow nanocoils (FIG. 2B). The formed interface serves as a passage for small cations ($Co^{2+}$ and $Fe^{2+}$ in the present invention) of the sacrificial nanocoil, but large anions (metal precursors ($HCrO_4^-$, $MnO_4^-$) and phosphates ($H_2PO_4^-$, $HPO_4^{2-}$ and $PO_4^{3-}$ in the present invention)) result in a difference in the ion transfer rate between the inside and outside so that a small porous pore is formed that prevents the passage of ions (Kirkendall effect). Due to this, the nanocoil gradually changes into a hollow nanocoil with an empty inside. The reaction of the hollow nanocoil has intermediate characteristics between the original nanocoil and the hollow nanocoil depending on the reaction time at the corresponding temperature. For example, in the initial stage of the reaction, it has magnetism, which is a characteristic of the CoFe sacrificial nanocoil used as an example in this experiment, but as the inside gradually becomes empty, it completely loses the magnetism and changes to a hollow nanocoil (FIGS. 2A to 2D).

Hereinafter, the present invention will be described in detail by the following Experimental Examples and Preparation Examples. However, the following Experimental Examples and Preparation Examples are merely illustrative of the present invention, and the content of the present invention is not limited by the following Experimental Examples and Preparation Examples. In addition, since these Experimental Examples and Preparation Examples are only for the purpose of helping the understanding of the present invention, the scope of the present invention is not limited thereto in any sense.

Experimental Example 1. Synthesis of Hollow Nanocoil (1) Manufacture of AAO Porous Nanotemplate-Sacrificial Nanocoil (CoFe NC)

Sacrificial nanocoils were synthesized by single bath electrodeposition using an anodized aluminum oxide (AAO) porous nanotemplate having a pore size of 200 nm. First, a 300 nm-thick silver layer was deposited on one side of the AAO template and used as a working electrode, and a platinum (Pt) sheet was used as a counter electrode. Cobalt sulfate heptahydrate ($CoSO_4·7H_2O$, 0.08 M), iron sulfate heptahydrate ($FeSO_4·7H_2O$, 0.08 M), vanadium sulfate hydrate ($VOSO_4·xH_2O$, 0.06 M), L-ascorbic acid ($C_6H_8O_6$, 0.06 M) were dissolved in deionized water (DI) to prepare a solution. The pH was adjusted to 2.5 by addition of nitric acid ($HNO_3$). For electrodeposition, a constant current density of 20 mA $cm^{-2}$ was applied using a source meter (Keithley 2612 B). After the electrodeposition was completed, the silver layer used as the working electrode was removed with an etchant to fabricate an AAO porous nanotemplate containing CoFe sacrificial nanocoils. The CoFe sacrificial nanocoils (CoFe NC) fabricated in the AAO porous nanotemplate had an average composition of Co50Fe50 (at %), an outer diameter of 180 nm, and an inner diameter of about 50 nm.

(1-1) Manufacture of CoFe Sacrificial Nanocoil

After the silver layer was removed with an etchant in the method of (1) above, the AAO porous nanotemplate was dissolved in a 1 to 3 M sodium hydroxide (NaOH, 3.0 M) solution at 45° C. for 15 min. Then, the dissolved (dissolved away) AAO porous nanotemplate was rinsed several times with deionized water, leaving, in the vial, only the CoFe sacrificial nanocoils (CoFe NCs) from which the AAO was completely removed.

(2) Manufacture of Inorganic Hollow Nanocoil ($Crpo_4$ and $Mno_xp_{0.21}$ Hollow Nanocoil)

Synthesis Method 1:0.83 mg of the CoFe sacrificial nanocoils (CoFe NC) manufactured in Experimental Example 1 (1-1) was dispersed (colloidal solution) in 7 mL of deionized water heated to 70° C. 2 mL of a previously prepared 10 mM aqueous $CrO_3$ (chromium oxide) solution or aqueous $KMnO_4$ (potassium permanganate) solution was added to the colloidal solution. At this time, the concentrations of $CrO_3$ and $KMnO_4$ in the colloidal solution was 2 mM. Then, 1 mL of a 5 M $H_3PO_4$ (phosphoric acid) solution was added to the 9 mL colloidal solution (the concentration of phosphoric acid in the total solution is 0.5 M) to synthesize hollow nanocoils in a water bath.

Synthesis Method 2: After heating a solution in which $HCrO_4^-$ (or $MnO_4$) was present in a solution made by dissolving 9 mM $CrO_3$ (or $KMnO_4$) and 0.5 M phosphoric acid in deionized water to 70° C., 10 mL of the solution was reacted with the remaining CoFe sacrificial nanocoils after washing in Experimental Example 1 (1-1) to synthesize hollow nanocoils.

(3) Manufacture of Inorganic Hollow Nanocoil ($MnAlPO_4$ Hollow Nanocoil)

In the method of Experimental Example 1-(1), an AAO porous nanotemplate containing a CoFe sacrificial nanocoil was placed in a vial. 7 mL of deionized water heated to 70° C. was put in the vial, and 2 mL of a previously prepared 10 mM aqueous $KMnO_4$ (potassium permanganate) solution was put into the vial. At this time, the concentration of $KMnO_4$ in the entire reaction solution was 2 mM. Then, 1 mL of a 5 M $H_3PO_4$ (phosphoric acid) solution was added to the 9 mL reaction solution (the concentration of phosphoric acid in the total solution is 0.5 M) to synthesize hollow nanocoils in a water bath.

Synthesis Method 2: After dissolving 9 mM of $KMnO_4$ and 0.5 M of phosphoric acid in deionized water and heating the solution in which MnO4− exists to 70° C., 10 mL of the solution was reacted with AAO porous nanotemplate-CoFe sacrificial nanocoils prepared in Experimental Example 1 (1) to synthesize a hollow nanocoils.

For homogeneity of the reaction, all reactions were carried out in a water bath with a sonication function. After completion of the reaction, the reaction temperature was lowered by immersion in ice water for about 30 seconds, and the reaction solution was washed several times with deionized water to manufacture inorganic hollow nanocoils (HNC). Finally, the washed inorganic hollow nanocoils were dispersed in ethanol.

A schematic diagram of the corresponding process is shown in FIGS. 1A to 1C, and FIGS. 2A to 2D show the synthesis process of the inorganic hollow nanocoils in the following order: 2A) a bright field transmission electron microscope (TEM) image of a sacrificial CoFe NC template before the reaction (0 min). 2B) the initial stage of the interfacial formation reaction (30 min). 2C) the dissipation of internal material through the interface (60 min). 2D) the final stage of the reaction at 70° C. (90 min).

Experimental Example 2. Confirmation of Material Characteristics (1) Method of Confirming Characteristics The morphology and dimensions of the synthesized sacrificial nanocoil template inside the AAO template were investigated by scanning electron microscopy (SEM; SU-70, Hitachi). Transmission electron microscope (TEM) and high-resolution TEM (HRTEM; JEM-2100F, JEOL) images were acquired to analyze the shape and structure of the synthesized inorganic hollow nanocoils. High-angle annular dark-field scanning TEM (HAADF-STEM) with aberration-corrected imaging and energy dispersive X-ray spectroscopy (EDS, X-MAXn, HORIBA) was used to determine the proportions of the constituent elements of the material.

(2) Characteristics of Inorganic Hollow Nanocoils

Figure 3A:
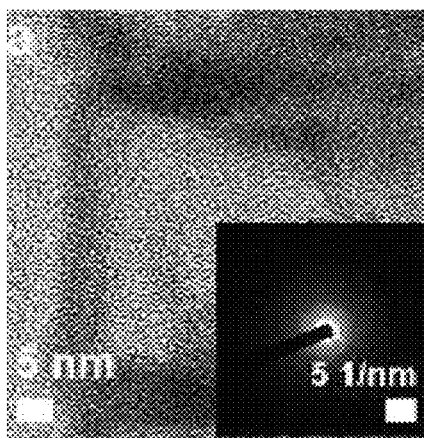
FIGS. 3A and 3B are Cr-based hollow nanocoils.
Figure 3B:
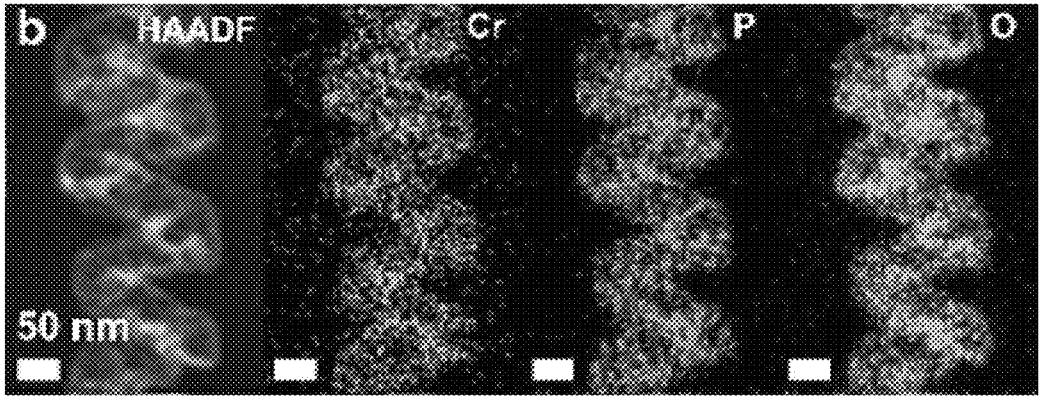
Figure 3C:
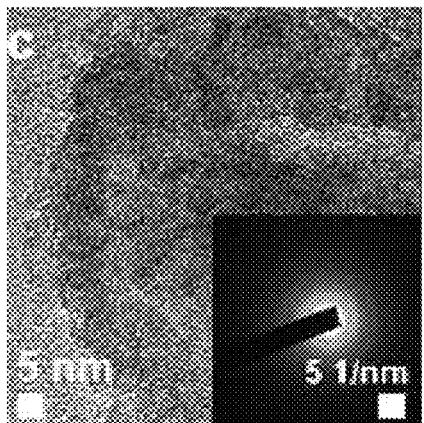
FIGS. 3C and 3D are high-resolution transmission electron micrographs and energy dispersive X-ray spectroscopy elemental analysis photographs of Mn-based hollow nanocoils.
Figure 3D:
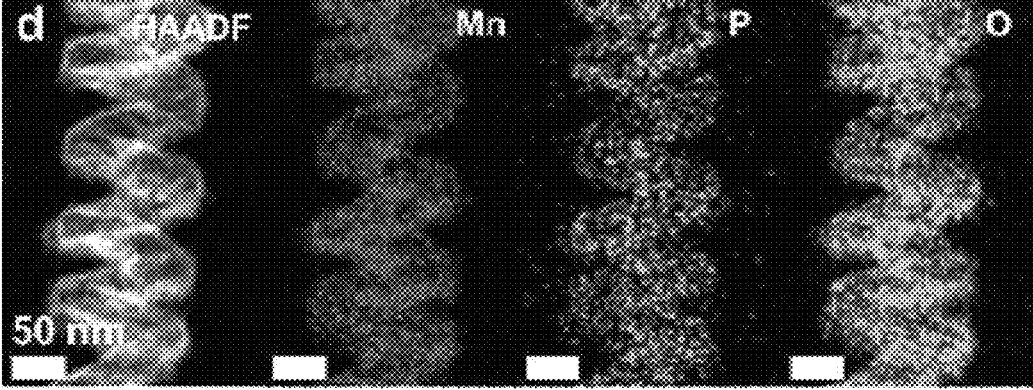

A high-resolution transmission electron microscopy (HR-TEM) image of a section of a Cr-based HNC with a smooth surface showed that the shell thickness of the hollow nanocoil was ~5 nm and was determined to be amorphous by selective-area electron diffraction (SAED) analysis (FIG. 3A). Scanning transmission electron microscopy combined with energy dispersive X-ray spectroscopy (STEM-EDX) was carried out on the fabricated Cr-based HNC, and elemental mapping analysis revealed non-localized distributions of Cr, P and O throughout the entire nanostructure. (FIG. 3B). Mn-based HNCs were observed to have a shell thickness of ~5 nm and were amorphous like the Cr-based HNCs. However, the surface roughness was found to be larger (FIG. 3C). Despite the presence of the same metal template to precursor ratio and the same acid concentration in the two fabricated HNCs, there is a slight difference in the amount of P present (FIGS. 3A and 3D). The atomic percent ratio of P to Cr of Cr-based HNCs (P/Cr ratio) was 1.22, whereas the atomic percent ratio (P/Mn) of Mn-based HNCs was 0.21. Further line profile analysis showed an overall mixing of the three components (FIGS. 4A and 4B). The two line-EDX results are consistent with the element mapping results, showing that all elements are relatively evenly distributed in the three-dimensional structure. However, as observed in the HRTEM images, the largest difference was at the surface. Elemental distribution analysis of Cr-based HNCs showed that Cr and P contents decreased simultaneously at the interface (FIG. 4A). However, in the case of Mn-based HNCs, the P content decreased more rapidly than the Mn content in the region near the interface (FIG. 4B). Therefore, it can be predicted that the material surrounding the Mn-based HNC surface is manganese oxide ($MnO_x$). As a result of elemental distribution analysis, in the case of Cr-based HNCs, the ratio of constituent atoms was Cr:P:O=10.85:13.38:75.77. In the case of Mn-based HNCs, the ratio of constituent atoms for the inner shell was Mn:P:O=19.87:5.33:74.79, for the outer shell, Mn:O=25.52:74.48, and the overall average ratio of constituent atoms of Mn-based HNCs was Mn:P:O=25.61:5.32:63.06.

Figure 5A:
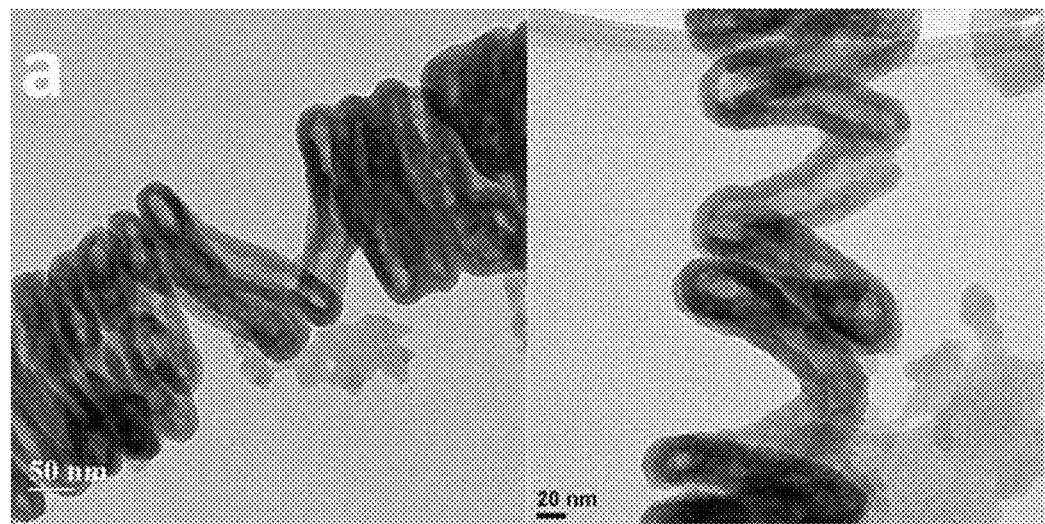
FIG. 5A is a transmission electron micrograph of a MnAl-based hollow nanocoil.
Figure 5B:
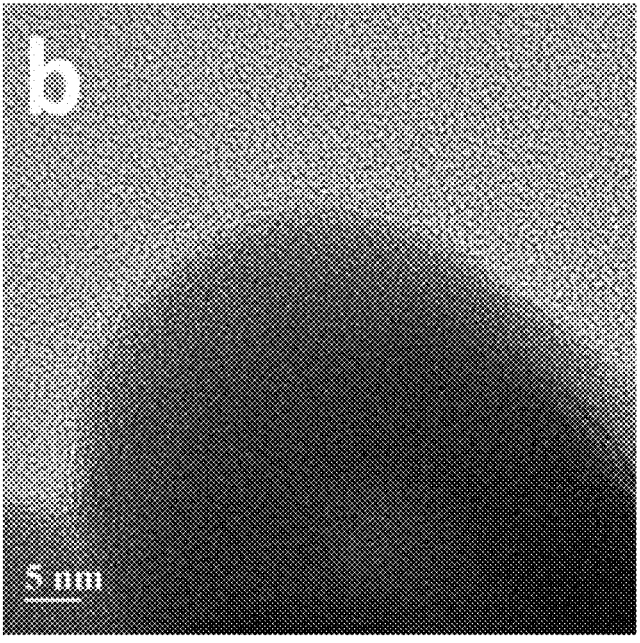
FIG. 5B is a high-resolution transmission electron micrograph of a MnAl-based hollow nanocoil.
Figure 6A:
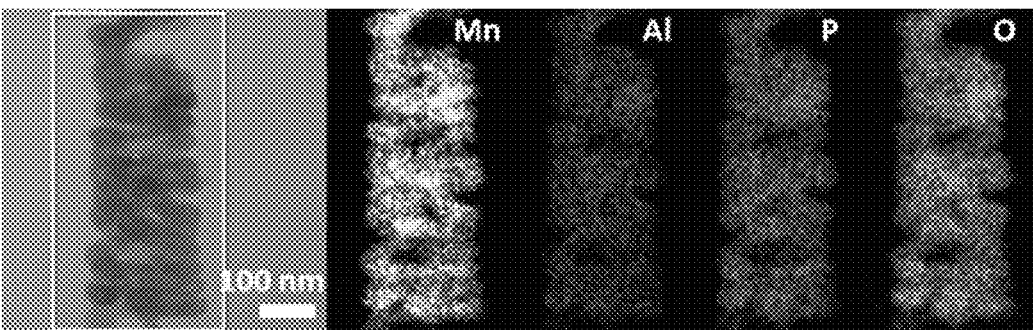
FIG. 6A is an energy dispersive X-ray spectroscopy element mapping analysis photograph of a MnAl-based hollow nanocoil.
Figure 6B:
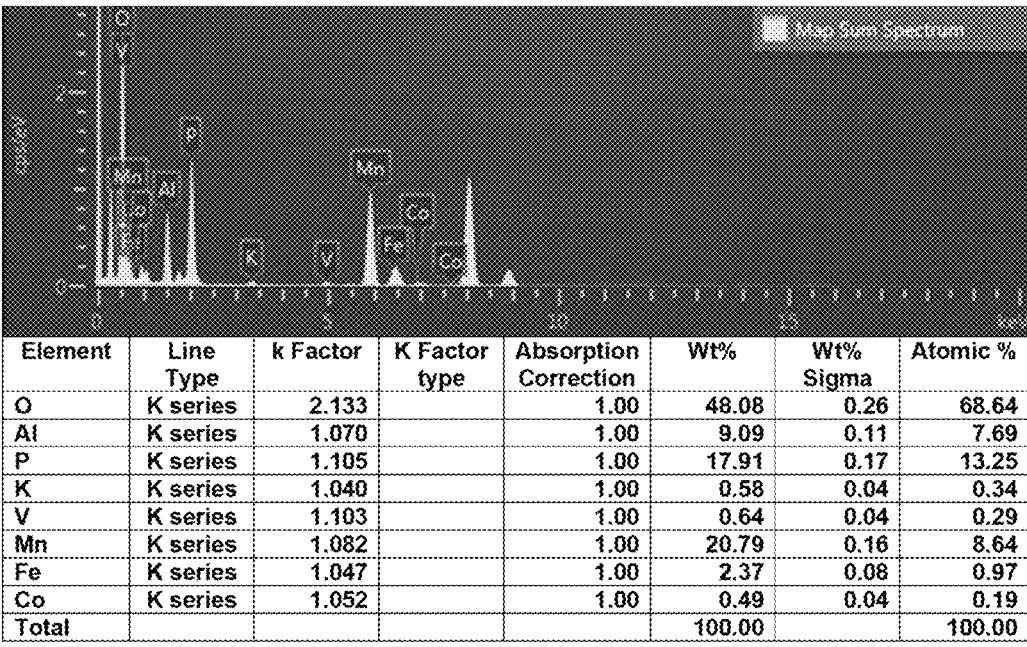
FIG. 6B is a spectrum and elemental content table of energy dispersive X-ray spectroscopy of a MnAl-based hollow nanocoil.

A high-resolution transmission electron microscopy (HR-TEM) image of MnAl-based HNCs ($MnAlPO_4$) (FIGS. 5A and 5B) showed that the hollow nanocoil had a shell thickness of 23 nm, and was determined to be amorphous like the Cr and Mn-based HNCs. The line-EDX result is consistent with the element mapping result, showing that all elements are relatively evenly distributed in the three-dimensional structure. As a result of elemental distribution analysis, the elemental ratio of the MnAl-based HNC was Mn:Al:P:O=8.64:7.69:13.25:68.64 (FIGS. 6A and 6B).

What is claimed is:

1. An inorganic hollow nanocoil having a helical structure in the form of a hollow tube,
   wherein the inorganic hollow nanocoil consists of XaZc and Xa'YbZc'; Xa'YbZc'; or XaWdYbZc,
   wherein in the case of XaZc and Xa'YbZc'; or Xa'YbZc', X is Cr or Mn; Y is P; Z is O; and
   a+a':b:c+c' is 1:1:4 to 1:1.4:7.5 or 1:0.1:1.5 to 1:0.3:4; and
   wherein in the case of XaWdYbZc,
   X is Mn; W is Al; Y is P; Z is O; and a:d:b:c is 1:0.7:1.4:6.5 to 1:1:1.7:9.

2. The nanocoil of claim 1, wherein the inorganic hollow nanocoil consists of Xa'YbZc',
   wherein X is Cr; Y is P; Z is O; and
   a':b:c' is 1:1:4 to 1:1.4:7.5.

3. The nanocoil of claim 1, wherein the inorganic hollow nanocoil consists of XaZc and Xa'YbZc',
   wherein X is Mn; Y is P; Z is O; and
   a:c is 1:2 to 1:4, a':b:c' is 1:0.15:3 to 1:0.4:5, and a+a':b:c+c' is 1:0.1:1.5 to 1:0.3:4.

4. The nanocoil of claim 1, wherein the inorganic hollow nanocoil consists of XaWdYbZc,
   wherein X is Mn; W is Al; Y is P; Z is O; and
   a:d:b:c is 1:0.7:1.4:6.5 to 1:1:1.7:9.

5. The nanocoil of claim 1, wherein the inorganic hollow nanocoil has an outer diameter of 50 nm to 500 nm.

6. The nanocoil of claim 1, wherein the inorganic hollow nanocoil has a shell thickness of 2 nm to 25 nm.

7. A method of manufacturing the inorganic hollow nanocoil of claim 1, comprising:
   manufacturing a solution in which sacrificial nanocoils containing a transition metal are dispersed; and
   reacting by adding a metal precursor and an acidic solution to the solution in which the sacrificial nanocoils containing the transition metal are dispersed, wherein the transition metal comprises one or more selected from the group consisting of Sc, Ti, V, Cr, Mn, Fe, Co, Ni, Cu, Zn, Y, Zr, Nb, Mo and Tc, wherein the metal precursor is a metal comprising one or more selected from the group consisting of Cr and Mn, wherein the acidic solution is a solution of phosphoric acid ($H_3PO_4$).

8. The method of claim 7, wherein the amount of the sacrificial nanocoils containing the transition metal is 0.005 to 0.2% (w/v) based on the total reaction solution.

9. The method of claim 7, wherein the concentration of the metal precursor is 1 to 20 mM based on the total reaction solution.

10. The method of claim 7, wherein the acidic solution further comprises potassium phosphate ($KH_2PO_4$), dipotassium phosphate ($K_2HPO_4$), tripotassium phosphate ($K_3PO_4$), sodium dihydrogen phosphate ($NaH_2PO_4$), disodium hydrogen phosphate ($Na_2HPO_4$) or trisodium phosphate ($Na_3PO_4$).

11. The method of claim 7, wherein the reaction is carried out at 50 to 100° C.

12. The method of claim 7, wherein the reaction is carried out at a pH of 0.5 to 3.

13. The method of claim 7, wherein the reaction is carried out for 0.5 to 2 hours.

14. An inorganic hollow nanocoil having a helical structure in the form of a hollow tube,
   wherein the inorganic hollow nanocoil has a helical structure in the form of a hollow tube, wherein an inner shell consists of Xa'YbZc', and an outer shell consists of XaZc, and
   wherein X is Mn; Y is P; Z is O;
   a:c is 1:2 to 1:4, a':b:c' is 1:0.15:3 to 1:0.4:5, and a+a':b:c+c' is 1:0.1:1.5 to 1:0.3:4.

* * * * *